United States Patent [19]

Muenchinger

[11] 4,040,328
[45] Aug. 9, 1977

[54] THREAD-FORMING FASTENER HAVING DUAL LOBULATION AND DIES FOR MAKING THE SAME

[75] Inventor: Herman G. Muenchinger, South Dartmouth, Mass.

[73] Assignee: Research Engineering & Manufacturing, Inc., New Bedford, Mass.

[21] Appl. No.: 665,537

[22] Filed: Mar. 10, 1976

[51] Int. Cl.² .................... B21D 17/04; F16B 25/00; F16B 39/30
[52] U.S. Cl. ..................... 85/46; 10/10 R; 72/88; 151/22
[58] Field of Search ............ 85/46, 47; 151/22, 14 R; 10/10 R, 111; 72/88

[56] References Cited
U.S. PATENT DOCUMENTS

| | | | |
|---|---|---|---|
| 3,180,126 | 4/1965 | Carlson | 85/47 X |
| 3,195,156 | 7/1965 | Phipard | 85/47 X |
| 3,681,963 | 8/1972 | Muenchinger | 85/47 X |
| 3,918,345 | 11/1975 | Phipard | 85/46 |

Primary Examiner—Ramon S. Britts
Attorney, Agent, or Firm—Olson, Trexler, Wolters, Bushnell & Fosse, Ltd.

[57] ABSTRACT

A thread-forming screw has a work-entering section for forming a thread in a workpiece and a work-holding section adjacent thereto. Both sections are of an arcuate, polygonal lobular configuration in cross-section. The amount of lobulation on the holding section is considerably less than the lobulation on the work-entering section, which is of such magnitude as to insure effective thread-forming at low torque. The lobulation on the holding section is preferably just sufficient to effect a locking action with the thread of the workpiece and also to improve the stripping torque of the screw from the workpiece. The work-entering end of the fastener also has a pilot thread of about one turn and with a uniform width over 360° and sized approximately the same as the pilot hole in the workpiece to prevent cocking of the fastener as it is initially inserted into the pilot hole. Thread-rolling dies for forming the fastener have a die section with grooves of equal depth to roll the pilot thread.

8 Claims, 14 Drawing Figures

THREAD-FORMING FASTENER HAVING DUAL LOBULATION AND DIES FOR MAKING THE SAME

BACKGROUND OF THE INVENTION

This invention relates to improvements in thread-forming fasteners and to thread-rolling dies used for making the same.

One type of thread-forming screw which has been commercially successful in many parts of the world is that of the type shown in the U.S. Pat. No. 3,195,196 to Phipard that issued July 20, 1965. The screw shown in that patent is of a type having a lobular pitch surface cross section in the form of a generally arcuate polygon with an odd number of arcuate sides merging gradually with intermediate thread-swaging lobes. The work-entering end of the screw is tapered toward the work-entering point of the screw for insertion into the workpiece pilot hole. Preferably the screw has three lobes. A screw of the foregoing type has a generally uniform lobulation throughout its threaded length. Since the work-entering end forms the thread and the holding or shank section subsequently mates with the thread in the workpiece, the thread must have a lobulation that provides a low driving torque for thread formation and yet a high locking ability for engagement with the workpiece. consequently, the amount of lobulation in the screw is necessarily a compromise to effect the best possible combination of low-driving torque and good locking ability. Generally, the screws are designed to favor thread forming.

It has also been proposed to produce thread-forming fasteners with a lobular work-entering portion and a circular holding section. Typical of such screws are those shown in U.S. Pat. Nos. 3,246,556 to Phipard that issued Apr. 19, 1966 and to Muenchinger 3,681,963 that issued Aug. 8, 1972. However, where the holding section is of circular cross section there is a reduction of stripping torque and a reduction in the effective locking action with the workpiece as compared to the lobular form. Because the holding section is of circular cross section there are no lobes or like areas that tend to bite into the workpiece to effect a locking action and an increase in both strip torque and locking action.

Another problem in self-tapping fasteners resides in the difficulty in aligning the fastener with the hole in the workpiece, particularly in workpieces of substantial thickness. When a self-tapping fastener is introduced into the pilot hole of a workpiece, the fastener tends to have its central axis lie at an angle to the central axis of the hole of the workpiece. The reason for this lies in the fact that the tapering lead thread of the screw tends to trace a spiral path with the result that in any cross section there is substantially no more than one point from the thread whose distance from the axis is one half the pilot hole diameter. Thus, in theory the screw axis at the starting may have an angularity as much as the angle of the taper of the thread. Such angularity or "cocking" of the screw is objectionable in that there is difficulty in starting the screw in a threading operation without undue end pressure. Also the screw may end up "cocked" when fully threaded into the workpiece.

OBJECTS AND SUMMARY OF THE INVENTION

An object of this invention is to provide a thread-forming fastening device in which the tapered work-entering section is of a substantial lobulation to insure ease of thread formation whereas the holding section of the screw is of a considerably lesser lobulation, namely only a very moderate out of round to the extent necessary to insure an adequate prevailing torque and locking ability of the screw. This is in contrast to present day lobular thread-forming screws wherein the lobulation tends to favor thread-formation rather than holding power.

A further object of this invention is to provide a thread-forming fastener with dual lobulation of the type and for the purpose stated in which the relative lobulation of the work-entering section and the work holding section is defined within certain empirical limits which will result in a screw that is more effective for both threading and holding than has been possible with screws of the types referred to previously herein.

Another object of this invention is to provide a self-threading fastener of the type stated in which there is a pilot thread of about one turn which is used to prevent cocking of the fastener as it is introduced into the pilot hole of the workpiece and also to reduce the amount of end pressure needed to start the screw. This pilot thread has a crest cross section of substantially uniform width throughout 360° C and has a maximum crest diameter that is less than the maximum crest diameter of thread in the work-holding section. The uniform width of the pilot thread is slightly less than the diameter of the pilot hole in the workpiece.

A still further object of this invention is to provide a die pair for forming the fastener of the present invention, each die of the pair having thread-forming ridges for rolling a thread on the holding section and the tapered thread formation on the work-entering section, and a further section having ridges and grooves of equal depth to form the pilot thread.

In accordance with the foregoing objects the fastening device has a continuous rolled thread on both its work-entering section and its work-holding section and with the thread formation on the work-entering section being tapered and having a pitch surface cross section in the form of a generally arcuate polygon with an odd number of arcuate sides merging gradually with intermediate thread-swaging lobes. The thread formation on the work holding section likewise has a pitch surface cross section in the form of a generally arcuate polygon with an odd number of arcuate sides merging gradually with intermediate lobes. The number of sides and lobes in the holding section are respectively the same as the number of sides and lobes in the work-entering section, and with the radius of curvature of the arcuate sides in each section being substantially greater than the radius and curvature of the lobe in that section. The lobulation in the holding section is substantially less than the lobulation in the work-entering section, the lobulation being defined as the maximum distance from the crest of the thread at an arcuate side to the circle that inscribes the crest of the thread at the adjacent lobes. The lobulation in the work-entering end is sufficient to provide a low-torque thread-forming action while the lobulation in the holding section is a sufficient departure from a circular configuration to enhance the locking effect in the holding section and also to increase the stripping torque when the holding section is threaded into the workpiece. These improved results are due to the limited amount of elastic deflection of the lobular regions of the holding section when the screw is tightened in the workpiece thread.

The maximum and minimum lobulation of each section is defined within limits which are hereinafter specified.

DETAILED DESCRIPTION

Figures 1, 2, 3, 4:
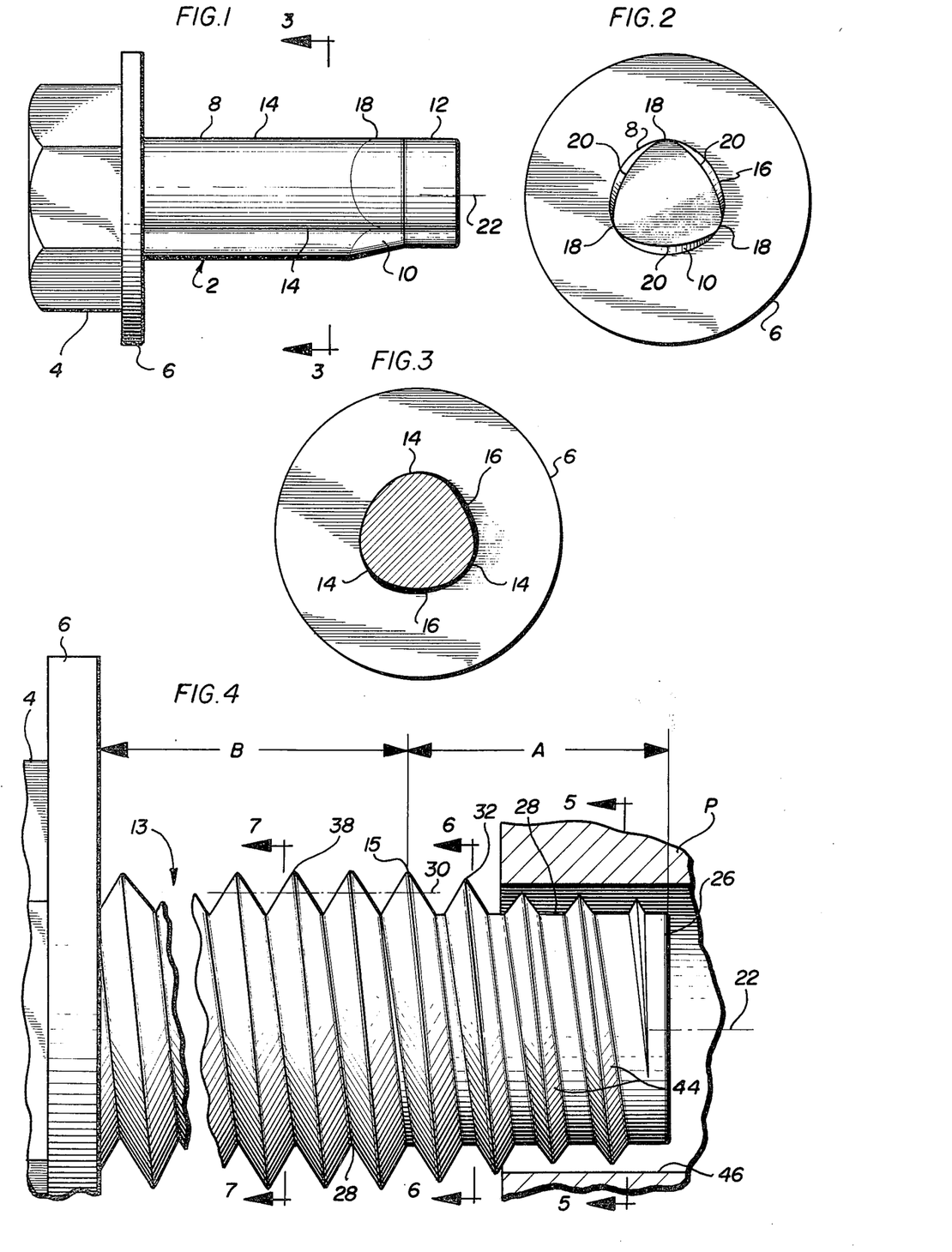
FIG. 1 is a side elevational view of a screw blank used in the formation of a screw constructed in accordance with and embodying the present invention.
FIG. 2 is a front elevational view of the blank of FIG. 1.
FIG. 3 is a sectional view taken along line 3—3 of FIG. 1.
FIG. 4 is an enlarged fragmentary side of elevational view of a screw that is roll-threaded on the dies of FIGS. 9-10, utilizing the blank of FIGS. 1-3, and showing the screw inserted into a workpiece preparatory to the threading operation, the section being taken along the center line of the workpiece opening.

Referring now in more detail to the drawings there is shown in FIGS. 1-3 a screw blank 2 having at one end thereof a hexagonal driving head 4 and adjacent flange washer 6. The blank also comprises a shank section 8 of lobular, arcuate triangular cross section and an intermediate tapered transitional portion 10 also of lobular, arcuate triangular cross section. However, the extent of lobulation, namely the amount of out of round, of the tapered transitional portion 10 is greater than the extent of lobulation in the section 8, as may best be seen from FIG. 2. Forwardly of the tapered transitional portion the blank has a lead section 12 also of lobular arcuate triangular cross section and preferably the same as that in the portion 10. As will be seen hereafter, when the blank 2 is passed between the thread rolling dies of FIGS. 9 and 10, the thread formation on the holding section B (FIG. 4) will be rolled out of the metal of the section 8 whereas the thread formation on the work-entering section A (FIG. 4) will be rolled on the metal on the tapered transitional portion 10 and lead section 12.

The lobular cross section of the blank section 8 is defined by the lobes 14,14,14 which merge with arcuate sides 16,16,16 having longer radii of curvature than that of the lobes 14,14,14. Likewise, the transitional portion 10 has lobes 18,18,18 and intermediate sides 20,20,20, the latter having longer radii of curvature than do the arcuate sides 16. The respective arcuate sides and lobes are all symmetrically arranged about the longitudinal axis 22 of the blank 2. The lobes 18 form respective axial continuations of the lobes 14, although the lobes 18 are more sharply defined than are the lobes 14. The transverse width of the blank taken through the axis 22 is uniform throughout 360°. An important aspect of this invention, however, lies in the fact that the cross-sectional configuration of the section 8 is not circular but is lobular, but with a lesser amount of lobulation than that which is in the transitional portion 10 or the lead sections 12. The preferred relationship between the lobulation in the section 8 and that in the portion 10 and section 12 will depend upon the desired relative lobulation in the finished screw between the work-entering section and the holding section. These preferred relative amounts of lobulation have been analytically determined, and will be hereinafter more fully described.

Figures 9, 10, 11:
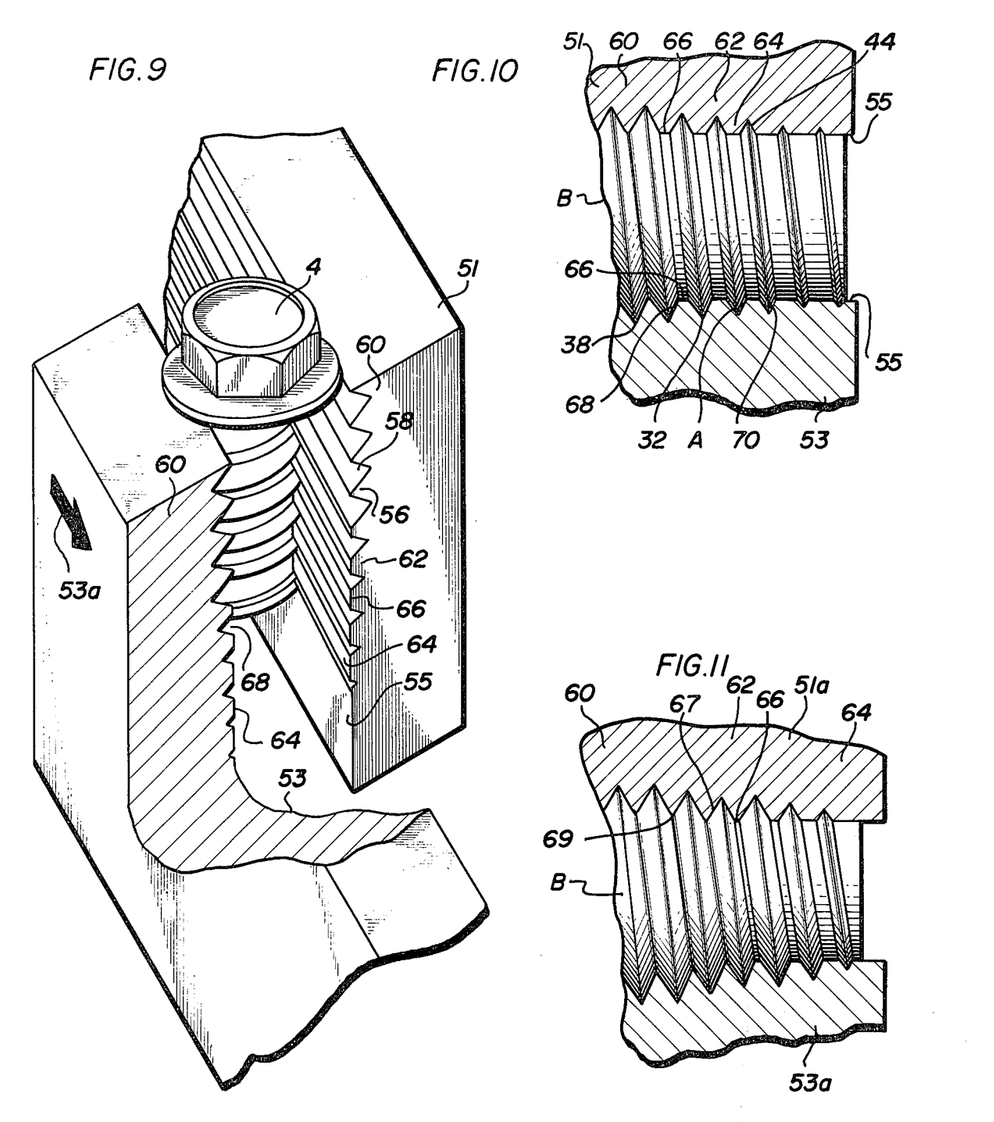
FIG. 9 is a fragmentary perspective view, partially in section, and showing a pair of dies rolling a blank therebetween to form the screw of this invention.
FIG. 10 is a transverse sectional view through the dies of FIGS. 9 and 10 but with the screw being shown in elevation.
FIG. 11 is a sectional view similar to FIG. 10 and showing a modified form of die construction.

FIGS. 4—7 show the screw 13 that is formed by rolling the blank of FIGS. 1-3 in the dies of FIGS. 9-10. More particularly, the screw 13 comprises a work-holding zone or section B and a work-entering zone or section A as shown in FIG. 4. It will be seen that the section A runs from the beginning of the thread, namely at or near the work-entering tip 26 to the maximum diameter part 15 of the tapered thread formed in the work-entering section A. The work-holding section B extends from the maximum diameter part 15 of the work-entering section A for a predetermined length, usually the balance of the thread. This generally runs substantially to the washer 6. The juncture of the zones A and B is not abrupt but preferably the zones A and B gradually and smoothly merge with one another.

Figures 5, 6, 7, 8, 8A, 8B:
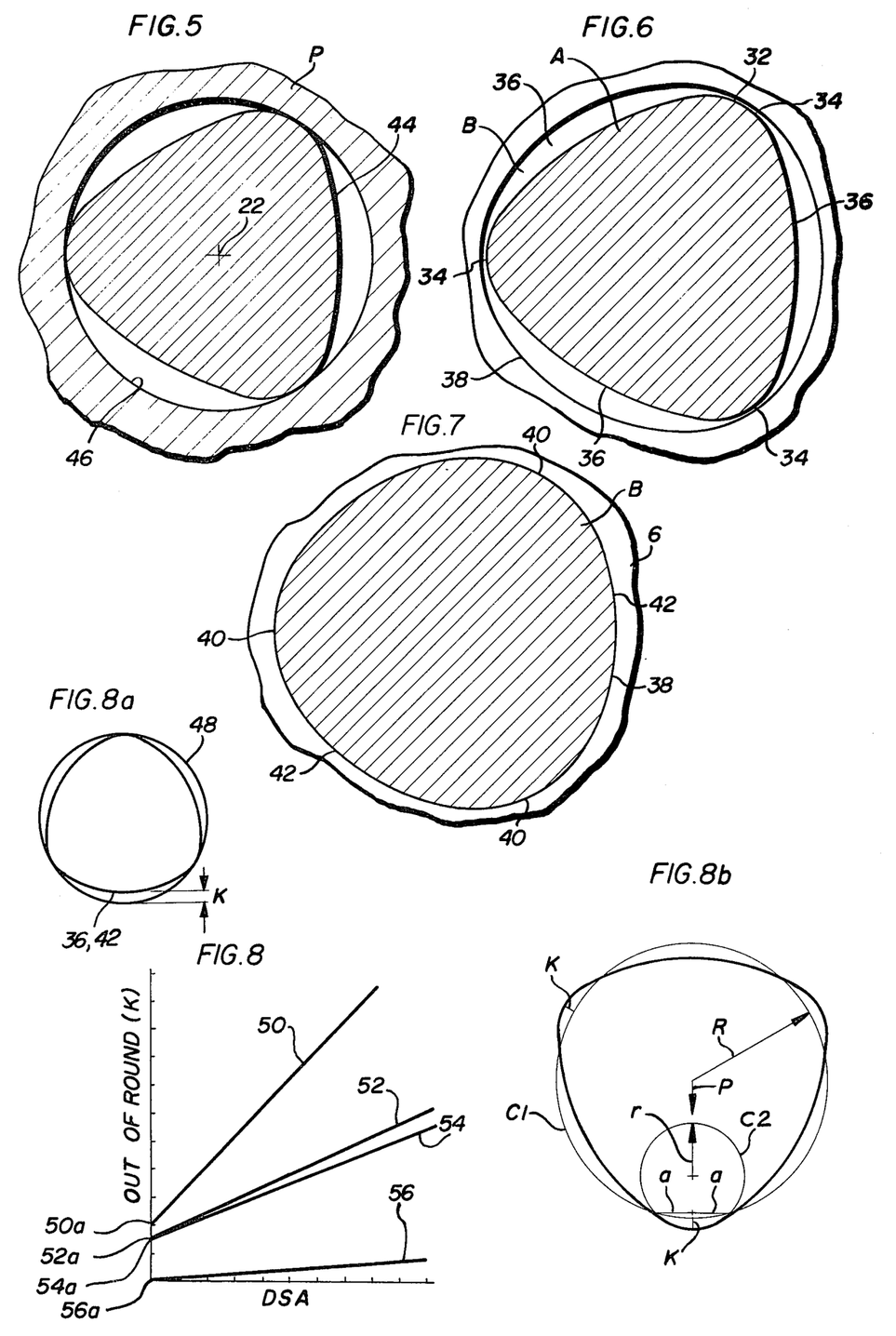
FIGS. 5, 6 and 7 are fragmentary sectional views taken approximately along lines 5—5, 6—6 and 7—7 of FIG. 4.
FIG. 8 is a graph indicating the ranges of lobulation for the work-entering section and the holding section of the screw of this invention.
FIG. 8a is a diagrammatic view of a lobular thread cross section, to be used with FIG. 8 to determine out of roundness.
FIG. 8b is a diagram relating to the analysis of minimum out of round of the holding section.

The thread formation in the work-entering section A is of the usual profile having a root 28, a pitch 30 and a crest 32. The pitch line is indicated by broken line 30. Furthermore, the root, pitch, and crest cross sections are each in the form of a generally arcuate polygon with an odd number of arcuate sides merging gradually with intermediate arcuate lobes. More specifically, and as is preferred, the arcuate polygon is a triangular one. Furthermore, the tapering of the thread formation on the work-entering section A results from the fact that the crest cross section progressively diminishes in width, the taper being toward the tip 26. Consequently, and as best seen in FIG. 6, the work-entering section A may be said to have thread-swaging lobes 34,34,34 joined by arcuate sides 36,36,36 gradually merging with the lobes 34,34,34. The crest cross-section, the root cross section, or the pitch cross section, as the case may be, will each be a lobular, arcuate, triangular shape similar to that shown in FIG. 6.

The thread formation in the work-entering section A continues into the work-holding section B wherein the pitch 30 of the thread as well as the root 28 are the same as in the section A. The crest 38 is not tapered but is of uniform width throughout 360°. By uniform width it is meant that the distance between any two parallel planes tangent to the crest will be uniform or constant regardless of the orientation of those planes. Preferably also, this uniform width throughout 360° is also true of the pitch and root. In any event and as best seen in FIGS. 6 and 7, the holding section B has a crest cross section with lobes 40,40,40 that merge with intermediate sides 42,42,42.

As will best be seen by a comparison of FIGS. 6 and 7, the amount or extent of lobulation of the holding section B is considerably less than that of the work-entering section A. The moderate amount of lobulation in the holding section B will result in some elastic deflection of the lobular portions 40 due to stress concentrations therein. Consequently, an improved locking action of the holding section B thread with the thread formed in the workpiece P will be provided.

Also on the work-entering section A intermediate the tapered thread formation and the tip 26 is a pilot thread 44 which may be a thread formation of one or more turns, as desired. The pilot thread 44 merges with the tapered thread formation of the zone A; however, the pilot thread 44 is not tapered but is of uniform width throughout 360°. This is best shown in FIG. 5, which illustrates the pilot thread as having a crest diameter approximately the same as the diameter of the hole 46 in the workpiece. The one or two turns of pilot thread 44 result in the alignment of the screw axis 22 approximately with the longitudinal axis or center line of the workpiece hold 46, thereby to prevent cocking of the screw during beginning of the threading operation. The pilot thread 44 also reduces the amount of end pressure required to start the threading operation. The crest diameter of the pilot thread 44 is preferably the same as or slightly less than the pitch diameter 30 for most general applications.

FIGS. 8 and 8a show the manner in which the preferred amounts of lobulation in the sections A and B can be determined. FIG. 8a shows a value K, which is a measure of out of roundness or lobulation. Thus, the value of K or lobulation may be defined as the maximum distance from the crests of the thread at an arcuate side 36 or 42, as the case may be, to the circle 48 that inscribes the crest of the thread as shown in FIG. 8a. This value of K is plotted as a function of the diameter of the stress area, abbreviated as DSA. For a screw of circular cross section (crest, root and pitch) the stress area is the area of the circle whose diameter is the arithmetic mean of the pitch diameter and the root diameter of the thread. For a thread of lobular cross section the definition is the same except that the root diameter is measured at the point of maximum root diameter at a lobe in the holding section B.

The straight or substantially straight lines 50 and 52 of FIG. 8 (not to scale) were determined by computation of the stress area (and hence its diameter) for various known lobular arcuate triangular screws, such as U.S. National Fine and National Coarse screw series in addition to various standard metric sizes. A scattering of points (not shown) based on out of round produced the lines 50, 52 which were approximately at the boundary of the spread of points plotted. In each instance the lobulation was uniform throughout. Consequently, for each DSA value the ordinate extending between plots 50 and 52 represents the range of maximum and minimum lobulation for the work-entering section A. That same ordinate line extended downwardly to cut across the plots 54, 56 will produce the maximum and minimum lobulation for the holding section B for that particular screw. Like lines 50,52, it is assumed that plots 54 and 56 are also substantially straight lines.

It has been found that the slope of the line 50 is substantially 0.042 and the line 50 intersects the zero line for DSA at a point 50a which is 0.05 millimeters. The line 52 intersects the zero point for DSA at 52a, which is 0.04 millimeters and the slope of the line 52 is approximately 0.020. Line 54 representing the maximum holding section lobulation has a slope of substantially 0.0176 and intersects the 0 line for DSA at 54a which is also 0.04 millimeters. Finally, line 56 has a slope of 0.0025 and intersects the origin 56a of the graph of FIG. 8.

Thus, the work-entering section, the maximum and minimum lobulations K (expressed in millimeters) are as follows:

Maximum K = 0.042 DSA + 0.05
Minimum K = 0.020 DSA + 0.04

The maximum and minimum lobulations K (expressed in millimeters) for the holding section are as follows:

Maximum K = 0.0176 DSA + 0.04
Minimum K = 0.0025 DSA

The range of lobulation in the work-entering section may vary depending upon the material of the workpiece. In any event, the lobulation can be designed to favor low torque threading. On the other hand, the lobulation in the holding section need only be sufficient such that the lobes therein are deflected so as to provide a locking action with the workpiece. For thin metals only a slight amount of lobulation may be needed.

With further regard to the minimum lobulation of the holding section B, the value K = 0.0025 DSA is a practical minimum lobulation that can be fabricated and measured. The suitability of this K value may be verified by analogy with the contact stress between cylinders of different diameter, one rolling within the other, and having a load applied radially outwardly through the center of the smaller circle. By this analogy it is believed that the radial force on the rolling cylinders is analogous to the radial component of force of the thread engaging its mating thread where elastic materials are involved. Referring to FIG. 8b, the larger and smaller circles C1, C2 have radii R and r respectively. The value of K represents the out of round of the lobular form and the load through the centers of the circles represented by P. The elastic deflection of the cylinders represented by circles C1 and C2 is assumed as the value K. If K = 0.0025 DSA, then K = 0.005R. The relationship of r and R is known for a given K. Thus, for K = 0.005R, the value r = 0.98134R. Also it may be readily derived from the known equation $a^2$ = K (2r —K) that the contact zone a = 0.099R where a is the half chord of the circle C2 shown in FIG. 8b.

The average unit compressive stress, denoted as T, may be derived by using the so-called Hertz equations and related material which are known and may, for example, be found in M. F. Spotts, *Mechanical Design Analysis*, pp. 166–171, published in 1964 by Prentice Hall, Englewood, New Jersey, U.S.A., especially the formulae at Figure 9.6 on p, 171. Assume that the cylinders C1, C2 are of steel (modulus of elasticity E1 = E2 = 3 × $10^7$ psi) and that the load P = T(2a). Using the known Hertz formula:

$$a = 1.076 \sqrt[2]{\frac{PRr}{(R-r)} \cdot (\frac{1}{E1} + \frac{1}{E2})}$$

It can be determined that T = 8936 psi or 61614 Kilo Pascals.

For a determination of maximum compressive stress the known Hertz equation below may be used:

$$\text{Max. Stress} = 0.591 \sqrt[2]{\frac{PE1 \cdot E2}{(E1 + E2)} \cdot (\frac{1}{r} - \frac{1}{R})}$$

Using the same values as above, it can be derived that the maximum stress is about 13,276 psi (91538 Kilo Pascals). In a thread the stress would actually be distributed over a smaller area per unit length of the screw which would tend to raise the maximum stress. Nevertheless, even doubling this maximum stress is well within the elastic limits of the materials.

The following represent test data (Metric and English) on the screw of the present invention compared with (1) standard tri-lobular screws having uniform lobulation in the holding and thread-forming sections (designated Type I), and (2) screws having a lobular thread-forming section and circular holding sections (designated Type II). Specimen screws were tested in weld nuts of Rockwell B hardness of 82–84 having a 0.280 inch (7.11 mm) pilot hole diameter. Screws were nominally size 5/16 − 18 (M 7.9 × 1.41). The value X in each case represents the arithmetic average of the data. For the Type I, screw K = 0.30 mm. For the type II screw, K = 0.46 mm. maximum in the lead section. For the screw of the invention, K = 0.152 mm in the holding section B and K = 0.356 mm in the thread-forming section A. The DSA in each instance is approximately 6.56 mm.

DATA I

STARTING END PRESSURE:

| INVENTION | | TYPE II | |
|---|---|---|---|
| Pounds | Newtons | Pounds | Newtons |
| 7 | 31.1 | 7 | 31.1 |
| 6½ | 28.9 | 12 | 53.4 |
| 6 | 26.7 | 9¾ | 43.4 |
| 8 | 35.6 | 7 | 31.1 |
| 5½ | 24.5 | 11½ | 51.2 |
| 5½ | 24.5 | 10 | 44.5 |
| X = 6.42 | X = 28.5 | X = 9.54 | X = 42.5 |

DATA II

Maximum angularity (cocking) at start of driving operation:

| INVENTION | | TYPE II | |
|---|---|---|---|
| 2° | 1°40' | 1¼° | 3°10' |
| 1° | 2° | 5°5' | 3¾° |
| 2° | 2°15' | 2½° | 1°50' |
| 1½° | 2½° | 2½° | 3½° |

DATA III

Maximum drive torque to fully thread test nut:

| INVENTION | | TYPE I | | TYPE II | |
|---|---|---|---|---|---|
| LB-INS. | NEWTON-METRES | LB-INS. | NEWTON-METRES | LB-INS. | NEWTON METRES |
| 74 | 8.36 | 80 | 9.04 | 78 | 8.8 |
| 86 | 9.72 | 80 | 9.04 | 81 | 9.15 |
| 75 | 8.47 | 70 | 7.91 | 76 | 8.6 |
| 80 | 9.04 | 95 | 10.73 | 68 | 7.68 |
| 80 | 9.04 | 85 | 9.60 | 86 | 9.72 |
| 85 | 9.60 | 80 | 9.04 | 73 | 8.75 |
| 91 | 10.78 | 80 | 9.04 | 79 | 8.93 |
| 83 | 9.38 | 80 | 9.04 | 79 | 8.93 |
| 83 | 9.38 | 80 | 9.04 | 75 | 8.47 |
| 82 | 9.26 | 80 | 9.04 | 80 | 9.04 |
| X = 81.9 | X = 9.25 | X = 81 | X = 9.15 | X = 77.5 | X = 8.75 |

DATA IV

Prevailing (locking) torque:

| INVENTION | | TYPE I | | TYPE II | |
|---|---|---|---|---|---|
| LB-INS. | NEWTON-METRES | LB-INS. | NEWTON-METRES | LB-INS. | NEWTON-METRES |
| 42 | 4.75 | 20 | 2.26 | Ten (10) specimens showed zero prevailing torque after forming internal thread in test nut - virtually finger free engagement. | |
| 45 | 5.08 | 30 | 3.39 | | |
| 47 | 5.31 | 20 | 2.26 | | |
| 62 | 7.00 | 20 | 2.26 | | |
| 50 | 5.65 | 20 | 2.26 | | |
| 60 | 6.78 | 20 | 2.26 | | |
| 50 | 5.65 | 15 | 1.69 | | |
| 60 | 6.78 | 25 | 2.82 | | |
| 55 | 6.21 | 30 | 3.39 | | |
| 50 | 5.65 | 35 | 3.95 | | |
| X = 52.1 | X = 5.89 | X = 21.50 | X = 2.65 | | |

DATA V

Fail (Strip) torque:

| 380 | 42.93 | 320 | 36.16 | 342 | 38.64 |
|---|---|---|---|---|---|
| 365 | 41.24 | 300 | 33.90 | 305 | 34.46 |
| 380 | 42.93 | 295 | 33.33 | 346 | 39.09 |
| 380 | 42.93 | 300 | 33.90 | 315 | 35.59 |
| 375 | 42.37 | 320 | 36.16 | 303 | 34.23 |
| 365 | 41.24 | 325 | 36.72 | 322 | 36.38 |
| 370 | 41.80 | 315 | 35.6 | 297 | 33.56 |
| 375 | 42.37 | 275 | 31.07 | 341 | 38.53 |
| 380 | 42.93 | 310 | 35.02 | 332 | 37.51 |
| 355 | 40.11 | 319 | 36.04 | 363 | 41.01 |
| X = 372.5 | X = 42.08 | X = 307.9 | X = 34.79 | X = 326.6 | X = 36.90 |

DATA VI

Axial tensile pull-out load from test nut after tightening to 275–285 pound-inches (31–32 Newton-Metres)

| INVENTION | | TYPE I | | TYPE II | |
|---|---|---|---|---|---|
| LBS. | KN | LBS. | KN | LBS. | KN |
| 7375 | 32.80 | 7000 | 31.14 | 7500 | 33.36 |
| 8125 | 36.14 | 7000 | 31.14 | 7585 | 33.74 |
| 7500 | 33.36 | 6500 | 28.91 | 7750 | 34.47 |
| 7187 | 31.97 | 6750 | 30.02 | 8000 | 35.58 |
| 7625 | 33.92 | 6375 | 28.36 | 7875 | 34.81 |
| 7125 | 31.69 | 6687 | 29.74 | 7915 | 35.21 |
| 7750 | 34.47 | 7250 | 32.25 | 7500 | 33.36 |
| 7937 | 35.30 | 6625 | 29.47 | 8000 | 35.58 |
| 7625 | 33.92 | 6625 | 29.47 | 8165 | 36.32 |
| 7500 | 33.36 | 6750 | 30.02 | 8165 | 36.32 |
| X = 7574.9 | X = 33.69 | X = 6756 | X = 30.05 | X = 7840 | X = 34.87 |

Turning now to FIGS. 9 and 10, the pair of dies shown comprises a stationary die 51 and a movable die 53, the latter movable in the direction indicated by the arrow 53a. The dies are of similar construction so far as their thread-rolling construction is concerned; therefore, like numbers will indicate parts in the two dies 51, 53. The dies 51, 53 at least in the direction extending along the length of the blank, (i.e. transversely along the dies) has a generally flat profile. Thus, the die 51 has a flat section 55 along one side thereof. The die 51 also has alternating ridges and grooves 56, 58 for rolling the thread onto blanks. More particularly the die 51 comprises a first longitudinal section 60 with thread-forming ridges and grooves for forming the thread in the holding section B. Adjacent the first section 60 is a second longitudinal section 62 for forming the thread-swaging thread on the work-entering section A. Additionally, there is a third die section 64 for rolling the pilot thread 44. The second section 62 has truncated ridges 66 plus grooves 68 of varying depth to form a taper on the thread in the section A. In the section 64 the ridges are likewise truncated but the grooves 70 are of equal depth so as to form the pilot thread 44 of equal width throughout 360°.

The flat end portions 55 of each die lie in respective planes substantially coincident with the plane of the ridge 66 associated therewith. Such ridge 66 also coincides with those truncated die ridges that are between the ridge 66 and the flat surface 55.

Figure 12:
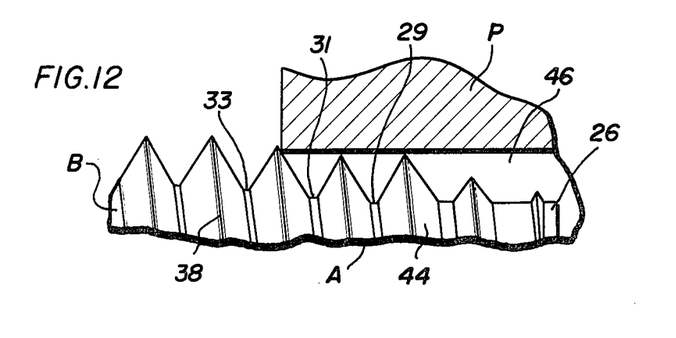
FIG. 12 is a fragmentary side elevational view showing an enlarged scale the screw of FIG. 11 inserted into a workpiece preparatory to the threading operation.

The dies 51a, 53a of FIG. 11 are similar to the dies 51, 53 except that each includes a ridge and groove design resulting in a screw in which the width of the root, namely its transverse dimension, increases toward the tip 26. Thus, the ridges 66, 67, 69, etc. are progressively further away from the plane of the flat end portion 53. The result is that in the fastener of FIG. 12 the roots 29, 31, 33, etc. are progressively wider in the direction toward the tip 26.

The invention is claimed as follows:

1. A thread-forming fastener having a work-entering section and a work-holding section, each section having more than one thread turn, a continuous roll thread on both said work-entering and work-holding sections, the thread formation on said work-entering section being tapered and having a pitch cross section in the form of a generally arcuate polygon with an odd number of arcuate sides merging gradually with intermediate thread-swaging lobes, the thread formation on said work-holding section also having a pitch cross section in the form of a generally arcuate polygon with an odd number of arcuate sides merging gradually with intermediate lobes, the number of sides and lobes in said holding section being respectively the same as the number of sides and lobes in said work-entering section, the radii of curvature of the sides in each section being substantially greater than the radii of curvature of the lobes in that section, and the lobulation in the holding section being substantially less than the lobulation in said work-entering section, said lobulation being defined as the maximum distance from the crest of the thread at an arcuate side to the circle that inscribes the crests of the thread at the adjacent lobes, the lobulation in said work-entering end being sufficient to provide a low torque thread-forming action in a workpiece, the lobulation in the holding section being a sufficient departure from a circular configuration to enhance in the holding section thread a locking action and an increase in the stripping torque when threaded into such workpiece, and a pilot thread section on said work-entering section intermediate the larger end of the tapered thread formation and the work-entering tip of the fastener for aligning the axis of the fastener with the axis of a hole in a workpiece when the pilot thread is inserted therein, said pilot thread section having a crest cross section of substantially uniform width throughout 360° and extending for at least approximately one thread turn.

2. A fastener according to claim 1 in which the lobulation in each section is substantially a function of the diameter of the stress area of the fastener, said stress area being defined as the area of a circle whose diameter is the mean of the pitch diameter and the root diameter of the thread, which root diameter is measured at the point of maximum root diameter at a lobe in said holding section.

3. A fastener according to claim 2 in which the number of arcuate sides in said polygon is three and the number of lobes is also three.

4. A thread-forming fastener device according to claim 1 in which said pilot thread section has a maximum crest diameter that is less than the maximum crest diameter of the tapered thread formation.

5. A thread-forming fastener having a work-entering section and a work-holding section, each section having more than one thread turn, a continuous roll thread on both said work-entering and work-holding sections, the thread formation on said work-entering section being tapered and having a pitch cross section in the form of a generally arcuate polygon with an odd number of arcuate sides merging gradually with intermediate thread-swaging lobes, the thread formation on said work-holding section also having a pitch cross section in the form of a generally arcuate polygon with an odd number of arcuate sides merging gradually with intermediate lobes, the number of sides and lobes in said holding section being respectively the same as the number of sides and lobes in said work-entering section, the radii of curvature of the sides in each section being substantially greater than the radii of curvature of the lobes in that section, and the lobulation in the holding section being substantially less than the lobulation in said work-entering section, said lobulation being defined as the maximum distance from the crest of the thread at an arcuate side to the circle that inscribes the crests of the thread at the adjacent lobes, the lobulation in said work-entering end being sufficient to provide a low-torque thread-forming action in a workpiece, the lobulation in the holding section being a sufficient departure from a circular configuration to enhance in the holding section thread a locking action and an increase in the stripping torque when threaded into such workpiece, the lobulation in each section being substantially a function of the diameter of the stress area of the fastener, said stress area being defined as the area of a circle whose diameter is the mean of the pitch diameter and the root diameter of the thread, which root diameter is measured at the point of maximum root diameter at a lobe in said holding section, and in which the range of lobulation of the work-entering section is as follows:

Maximum lobulation = 0.042 × diameter stress area + 0.05;

Minimum lobulation = 0.020 × diameter stress area + 0.04; and the range of lobulation of the holding section is as follows:

Maximum lobulation = 0.0176 × diameter stress area 30 0.04;

Minimum lobulation = 0.0025 × diameter stress area where the diameters of the stress area and the constants 0.04 and 0.05 are expressed in millimeters.

6. A thread-rolling die for forming a self-threading fastener having a holding section and a work-entering section, said work-entering section having a tapered thread-swaging thread formation and a non-tapered pilot thread formation between the larger end of said thread-swaging formation and an adjacent work-entering tip of the fastener, said pilot thread formation being of uniform width throughout 360° and extending axially at least approximately one thread turn; said die comprising first and second adjacent longitudinally extending sections of thread-forming ridges for rolling a thread on said holding section and for rolling said thread-swaging formation, said second section having truncated ridges and grooves of varying depth to form the taper on said thread-swaging formation, and said die having a third section adjacent to said second section with grooves of equal depth to form said pilot thread, the grooves being separated by ridges and the depth of said last-mentioned grooves being less than the depth of the adjacent grooves in said second section.

7. A die according to claim 6 including a ramp extending over at least a part of one of said sections to form a thread with a decreasing cross-sectional width of root.

8. A die according to claim 6 including a fourth section having a flat surface, the flat surface being in a plane that coincides with truncations on the ridges in said second and third sections.

* * * * *

UNITED STATES PATENT AND TRADEMARK OFFICE
CERTIFICATE OF CORRECTION

PATENT NO. : 4,040,328
DATED : August 9, 1977
INVENTOR(S) : Herman G, Muenchinger It is certified that error appears in the above-identified patent and that said Letters Patent are hereby corrected as shown below:

Column 2, line 25, after "360°" delete --C--;

Column 10, line 48, "30 0.04;" should be -- $\pm$ 0.04;--

Signed and Sealed this

Seventh Day of February 1978

[SEAL]

Attest:

RUTH C. MASON
Attesting Officer

LUTRELLE F. PARKER
Acting Commissioner of Patents and Trademarks